3,473,012
ELECTRICAL LOG-LOG CALCULATOR
Clarke C. Minter, 1517 30th St., NW.,
Washington, D.C. 20007
Filed Oct. 7, 1966, Ser. No. 580,406
Int. Cl. G06g 7/26, 7/28; G06f 15/34
U.S. Cl. 235—197   4 Claims

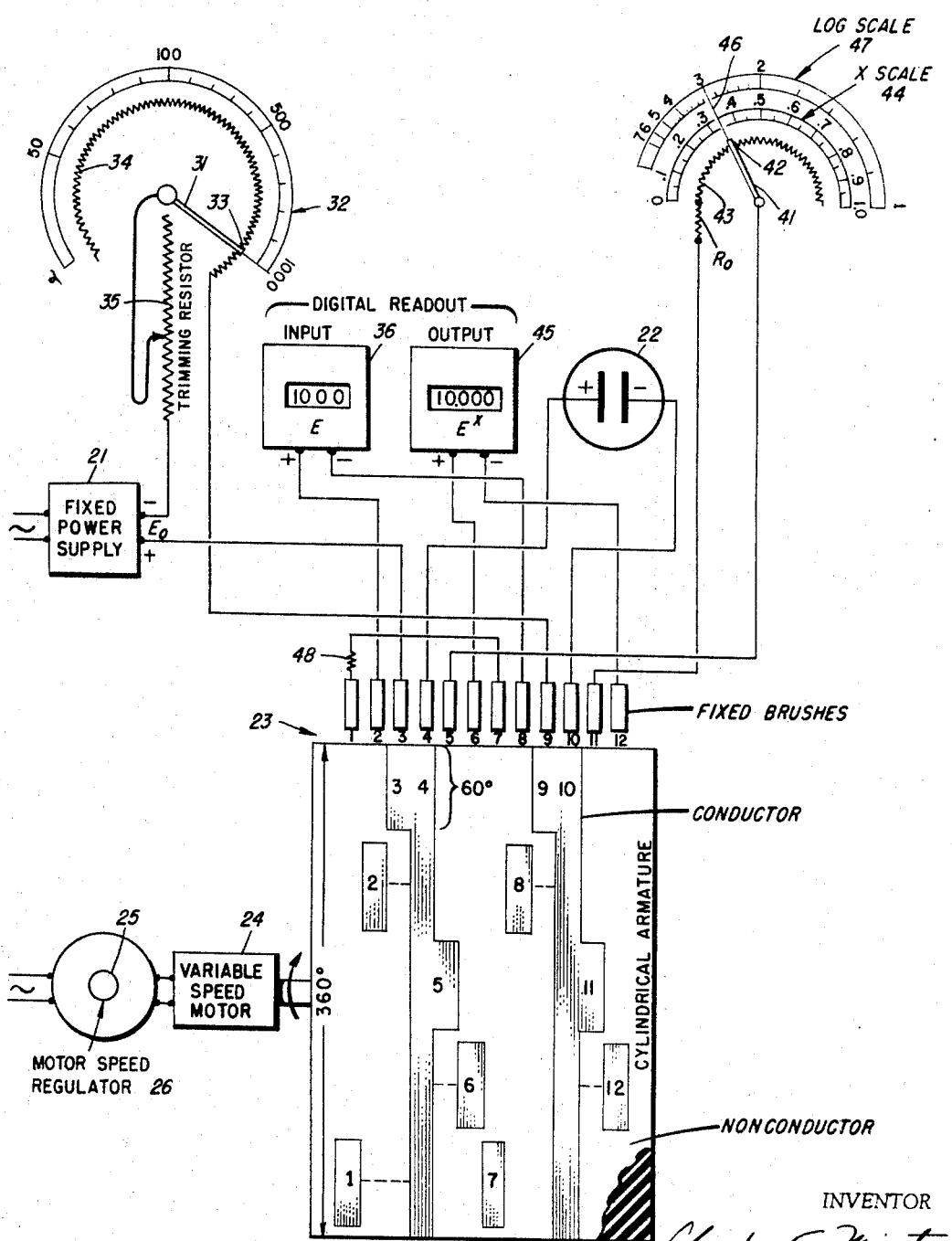

ABSTRACT OF THE DISCLOSURE

An RC circuit containing an electrolytic capacitor is employed as an analog computer to perform the same operations as the log-log slide rule. The electrolytic capacitor is charged to a potential E, and then discharged through a variable resistance so that the residual potential on the capacitor is any desired fractional power of E. When the after discharge potential is chosen as a base for logarithms, the logarithm of the potential E to that base can be indicated on a scale.

---

This invention relates in general to electromechanical devices and specifically to a method and apparatus for deriving an output voltage which is equal to a preselected fractional power of an input voltage.

A calculating machine for performing the ordinary operations of arithmetic can easily obtain the square, the cube, etc. of a number, but when root extraction is desired in one operation, the machine calculator is definitely limited to the square-root. On the other hand, electrical circuits with solid-state components for generating logarithmic functions have been developed for deriving the $n^{\text{th}}$ root of a number represented by a voltage ($E^{1/n}$), and illustrated by circuits for obtaining the square-root, cube-root, etc. In some prior art devices involving the use of a resistance-capacitance combination, roots such as ½, ⅓, etc., are obtained by taking corresponding fractional parts of a logarithm representing a time interval during discharge of a capacitor through a resistance, and taking the final voltage at the end of the discharge as the anti-logarithm of the time interval. Other circuits employ a combination of solid-state components and resistance-capacitance integrators to obtain the square-root, cube-root, etc. While in such prior art devices the roots are usually limited to ($E^{1/n}$), where $n=$ 1, 2, 3 ... it is possible by programming digital computers to derive the $x^{\text{th}}$ power of a number ($x=0$ ... 1.00); but such computers are large and costly. The $x^{\text{th}}$ power of a number can be obtained cheaply and simply by means of the log-log slide rule; but there is at present no small, cheap, electrical calculator which can perform the simple root extraction of a log-log slide rule, or obtain the logarithm of a number to any base.

It is therefore the primary object of this invention to provide a simple electrical calculating device which can derive an output voltage equal to any preselected fractional power $x$ of an input voltage ($x=0$ ... 1.00).

Another object of this invention is to provide a simple method for obtaining the logarithm of an input quantity to any base.

These and other objects of this invention are attained by the use of a polarized electrolytic capacitor arranged to be charged to a given input potential E and then discharged through a calibrated resistance in a given time $t$ to an output voltage $E^x$, where $x$ is the fractional power of the input voltage. Before describing my invention it is necessary to discuss the fundamental principles involved, and the treatment given below for the growth and decay of charge in a capacitor is in accord with conventional electrical theory.

If a capacitor having a capacitance C is charged to a potential E and then discharged through a resistance $R_x$ to the potential $E^x$ in the time $t$, we have $$E^x = E e^{-\frac{t}{R_x C}} \qquad (1)$$

in which $R_x C$ is the so-called time constant T, and $e$ is the base of natural logarithms. The above equation can be rewritten $$E^{(1-x)} = e^{\frac{t}{R_x B}} \qquad (2)$$

Taking logarithms $$(1-x)\ln E = \frac{t}{R_x C} \qquad (3)$$

and solving for $R_x$ $$R_x = \frac{t}{C(1-x)\ln E} \qquad (4)$$

Equation 4 states that, if ($t/\ln E$) is constant, the value of $R_x$ will be dependent only on the value of $x$, the fractional power to which the input quantity E is raised, no matter what the value of E. That is, as the input E is increased it is necessary to increase the time of discharge $t$ so that ($t/\ln E$) is constant. Therefore it is possible to calibrate a continuously-variable resistance in terms of $x$, so that a pointer could simply be set on the desired fractional power $x$ in order to derive the root $E^x$.

According to electrical theory, the basic equation for the charging process is $$E = E_0\left(1 - e^{-\frac{t}{R_s C}}\right) \qquad (5)$$

in which, $E_0$ is the constant charging potential, E is the potential on the capacitor at the time $t$, C is the capacitance, and $R_s$ is the series resistance, the product $R_s C$ being the time constant T. Since the capacitor being charged according to Equation 5 is the same capacitor being discharged according to Equation 1, the E in Equation 5 is the same E in Equation 1, and $t$ is the same in both equations. The problem, then, is to find what must be the value of the series resistance $R_s$ in Equation 5 in order that the charge potential E be attained in the charging time $t$.

If we take logarithms of Equation 5 and solve for $R_x$ we have $$R_s = \frac{t}{C \ln \frac{E_0}{E_0 - E}} \qquad (6)$$

It should be pointed out that, unlike air or solid dielectric capacitors, electrolytic capacitors exhibit a time-lag in both charging and discharging, so that the time constant $T_{\text{obs}}$ is always greater than $R_s C$ or $R_x C$. For this reason it is necessary to determine experimentally the values of $R_s$ and $R_x$. However, it has been observed that for a given capacitor, the ratio $T_{\text{obs}}/T_{\text{calc}}$ is constant.

My invention can be clearly understood by referring to the accompanying figure in which 21 is a constant source of D-C potential, 22 is a polarized electrolytic capacitor of suitable capacitance C, 23 is the plan of a rotary switch comprising a row of 12 fixed brushes for making contact with properly positioned conducting segments in a non-conducting cylindrical armature which can be rotated by the variable speed motor 24, the speed of which can be controlled by adjusting knob 25 of speed regulator 26. By means of brushes 4 and 10 capacitor 22 is in continuous contact with rings 4 and 10 which are connected to the five pairs of conducting segments on the armature. As the armature rotates the five pairs of conducting segments make contact in turn with five corresponding pairs of brushes, thereby bringing capacitor 22 into sequential contact with the other parts of the circuit to carry out a set of operations involving (a) charging the capacitor, (b) measuring the charge potential E, (c) discharging the capacitor through a calibrated resistance, (d) measuring the residual potential $E^x$ on the capacitor, and (e) reducing the charge on the capacitor to zero. It is simply a matter of convenience that the figure shows the five pairs of conducting segments on the armature to be of equal length, but it is obviously not necessary that the length of the charging period be the same as the length of the discharging period.

When it is desired to develop the fractional power of a number it is necessary first to place input pointer 31 at the desired point on the number scale 32. This operation positions a sliding contact 33 at the proper point on a nonuniform, continuous resistor 34 so that by adjusting the trimming resistor 35 the proper value of the series resistance $R_s$ of Equations 5 and 6 can be placed in series with power supply 21 and capacitor 22. When knob 25 and resistors 34 and 35 are properly set the desired value of E can be seen in the digital readout indicators 36 or any other suitable type of indicator. Rotating the armature of rotary switch 23 it can be seen in the figure that power supply 21 and series resistor $R_s$ (34 and 35) are connected to capacitor 22 when brushes 3 and 9 make contact with segments 3 and 9, whereby the capacitor is charged to the desired potential E during the proper length of time $t$, which depends on the speed of rotation of the armature. As the armature rotates segments 2 and 8 contact brushes 2 and 8 so that the potential E on capacitor 22 is shown on indicator 36.

In the preceding paragraph it was mentioned that the desired potential E is placed on capacitor 22 in the proper length of time $t$, which means that the speed of rotation (r.p.m.) of the armature must be adjusted so that brushes 3 and 9 are in contact with armature segments 3 and 9 for the time $t$. The proper (r.p.m.) of the armature can be set by the following procedure. After positioning pointer 31 at the desired point on the input number scale 32, pointer 41 is placed at the zero point on the fractional power $x$-scale 44. When pointer 41 is set at zero on scale 44 the resistance $R_0$ up to the contact 42 through which capacitor 22 discharges is just sufficient for the capacitor to be completely discharged in the time $t$, which makes $t/ln\ E$ constant. As the armature of the rotary switch continues to be rotated by motor 24 the operator observes indicators 36 and 45. The proper r.p.m. of the armature is reached by simultaneously adjusting knob 25 and trimming resistor 35 until the desired input E appears on indicator 36 at the same time indicator 45 shows zero. Once the proper r.p.m. is attained the pointer 41 is set to the desired fractional power on the $x$-scale 44. As the rotation of the armature brings segments 5 and 11 into contact with brushes 5 and 11 capacitor 22 discharges through calibrated resistance $R_x$ which comprises resistor 43 up to the point of contact 42. After discharging capacitor 22 through $R_x$ for the given length of time $t$ the rotating armature now brings segments 6 and 12 into contact with brushes 6 and 12 thereby connecting capacitor 22 with readout indicator 45 which shows the desired fractional power $E^x$. As the armature completes its rotation segments 1 and 7 come into contact with brushes 1 and 7 and connect capacitor 22 to the low resistance 48, whereby capacitor 22 is completely discharged to zero potential. Since the armature is rotating continuously the cycle of operations described above is repeated during each revolution. It is also obvious that by shortening the conducting segments more than one cycle of operations can be carried out in one revolution of the armature, and the speed of rotation can be reduced. For all practical purposes therefore the operation described above for deriving the root of an electrical quantity is continuous.

It is also obvious that if $E^x$ is made the base of a system of logarithms it is possible to determine the logarithm of E (log E). This follows by taking the logarithm of the relation log $E^x$=log BASE. Since the logarithm of the base is 1.00, we have $x$ log $E$=1.00, and the logarithm of E to the base $E^x$ is log $E$=1/$x$, which is the reciprocal of the $x$-scale, and is shown in the figure as log-scale 47. The procedure for obtaining the logarithm of a number to any base is to adjust the r.p.m. according to the procedure already described and then to vary the position of pointer 41 until the base of logarithms appears on indicator 45, whereby the logarithm of the number shown on indicator 36 (log E) will then be indicated on the log scale 47. As an illustration of the method the figure shows that $E$=1000 on indicator 36, indicator 45 shows $E^{1/3}$=10, while pointer 41 shows 0.333 on the $x$-scale, and 3.00 on the log-scale. It should be pointed out that the unit adopted in this illustration is one millivolt, but other units such as the microvolt, the decivolt, or even the volt could be employed.

It is understood, of course, that in the invention described above ordinary capacitors with air or solid dielectrics could be employed, but electrolytic capacitors are preferred because their high capacitance permits a much greater charge to be placed in a smaller volume.

What is claimed is:

1. Electrical calculating device comprising the combination of a charge storage means, adjustable switching means for placing said charge storage means into sequential contact for a variable length of time with (a) variable means for charging said charge storage means to the desired input potential, (b) open-circuit measuring means for indicating the input potential, (c) variable means for discharging said charge storage means to derive an output potential equal to a preselected fractional power of the input potential, (d) open-circuit measuring means for indicating the output potential, and (e) means for reducing the potential on said charge storage means to zero.

2. Electrical calculating device according to claim 1 in which the charge storage means is an electrolytic capacitor of suitable capacitance.

3. An electrical circuit for deriving a fractional power $x$ ($x$=0 . . . 1.00) of an electrical potential E comprising in combation an electrolytic capacitor and a variable speed rotary switch for connecting said capacitor to (a) a variable source of potential, (b) open-circuit measuring means for indicating when the input potential on said capacitor is E, (c) an adjustable discharge resistance with a pointer movable over two scales, one calibrated in terms of $x$, and the other calibrated in terms of 1/$x$=log $E$, (d) open-circuit measuring means for indicating when the after-discharge potential on said capacitor is $E^x$, and (e) means for reducing the potential on said capacitor to zero.

4. An electrical circuit for deriving the logarithm of a number E to the base $E^x$ ($x$=0 . . . 1.00) comprising the combination of an electrolytic capacitor with a variable speed rotary switch for connecting said capacitor to (a) a variable source of potential, (b) open-circuit measuring means for indicating when the potential on said capacitor is E, (c) an adjustable discharge resistance with a pointer movable over two scales, one calibrated in terms of $x$, and the other in terms of 1/$x$=log $E$, (d) open-circuit measuring means for indicating when the after-discharge potential on said capacitor is equal to the base $E^x$, and (e) means for reducing the potential on said capacitor to zero.

References Cited
UNITED STATES PATENTS
1,906,466   5/1933   Haskins _____ 324—60
2,455,543   12/1948   Williams _____ 324—60 X

FOREIGN PATENTS
1,018,877   2/1966   Great Britain.
143,141   3/1961   U.S.S.R.

OTHER REFERENCES
Lieberman, "A Capacitor Tester and Healer", Electronics World, April 1960, pp. 52 and 53.

MALCOLM A. MORRISON, Primary Examiner
R. W. WEIG, Assistant Examiner

U.S. Cl. X.R.
324—60